United States Patent [19]

Einerhand et al.

[11] Patent Number: 5,470,675
[45] Date of Patent: Nov. 28, 1995

[54] ELECTROCHEMICAL CELL COMPRISING A HYDRIDE-FORMING INTERMETALLIC COMPOUND

[75] Inventors: Robert E. F. Einerhand; Gerardus J. M. Lippits; Johannes L. C. Daams; Petrus H. L. Notten, all of Eindhoven, Netherlands

[73] Assignee: U.S. Philips Corporation, New York, N.Y.

[21] Appl. No.: 33,948

[22] Filed: Mar. 18, 1993

Related U.S. Application Data

[63] Continuation of Ser. No. 731,673, Jul. 17, 1991, abandoned.

[30] Foreign Application Priority Data

Jul. 24, 1990 [NL] Netherlands ............................ 9001677

[51] Int. Cl.$^6$ .................................................. H01M 4/04
[52] U.S. Cl. .......................... 429/101; 429/59; 429/218; 420/900

[58] Field of Search ............................ 429/59, 101, 218; 420/900

[56] References Cited

U.S. PATENT DOCUMENTS

| | | | |
|---|---|---|---|
| 4,487,817 | 12/1984 | Willems et al. | 429/27 |
| 4,623,597 | 11/1986 | Sapru et al. | 429/101 |
| 4,925,748 | 5/1990 | Ikoma et al. | 429/59 |
| 5,071,720 | 12/1991 | Notten | 429/101 |

*Primary Examiner*—Stephen Kalafut
*Assistant Examiner*—M. Nuzzolillo
*Attorney, Agent, or Firm*—Norman N. Spain

[57] ABSTRACT

A rechargeable electrochemical cell having a negative electrode, whose electrochemically active material comprises an intermetallic compound having the $CaCu_5$-structure which forms a hydride with hydrogen, obtains a high loadability and a long life cycle by virtue of the fact that the intermetallic compound comprises a non-stoichiometric metastable phase. The intermetallic compound is, preferably, of the type having the composition $AB_m$, where m exceeds 5.4.

8 Claims, 1 Drawing Sheet

ELECTROCHEMICAL CELL COMPRISING A HYDRIDE-FORMING INTERMETALLIC COMPOUND

This is a continuation of application Ser. No. 07/731,673, filed Jul. 17, 1991, now abandoned.

FIELD OF THE INVENTION

The invention relates to an electrochemical cell having a negative electrode, whose electrochemically active material comprises an intermetallic compound having the $CaCu_5$-structure which forms a hydride with hydrogen.

The invention also relates to an electrochemically active material for use in such a cell and to a method of manufacturing such a material.

BACKGROUND OF THE INVENTION

The electrochemical cell may be in open communication with the atmosphere or sealed from the atmosphere. A cell which is sealed from the atmosphere may comprise a valve which is dimensioned such that it becomes operative at a previously defined pressure.

In a rechargeable cell of the sealed type, the electrochemically active part of the positive electrode consists of, for example, nickel hydroxide, silver oxide or manganese oxide. Nickel hydroxide is generally preferred for practical reasons.

An electrolyte is used in the cell, which generally consists of an aqueous solution of one or more alkali metal hydroxides such as lithium hydroxide, sodium hydroxide and potassium hydroxide, having a pH value exceeding 7.

The cell may further comprise a separator which separates the electrodes electrically but permits ion and gas transport. Said separator may be composed of synthetic resin fibers (woven or not woven), for example, of polyamide fibers or polypropylene fibers.

Such an electrochemical cell is described in U.S. Pat. No. 4,487,817. In said patent, an electrochemically active material of the compositional formula $AB_mC_n$ is used, where A denotes, for example, a rare earth metal, B denotes a mixture of elements, for example, a mixture of Ni and Co, and C consists of Al, Cr and/or Si. The value of n ranges between 0.05 and 0.6. The value of m+n is selected such that the material has the $CaCu_5$-structure. The limits of m+n depend on the choice of the elements A, B and C. The value of m+n always ranges between 4.8 and 5.4, mostly close to 5.0. Such intermetallic compounds having a $CaCu_5$-structure exhibit the property that large quantities of hydrogen can be stored therein by means of the formation of hydrides. Said known compounds are prepared by cooling a melt and are stable at room temperature. The materials in accordance with said United States Patent have a great stability, so that the electrochemical cell has a long life cycle. In comparison with a compound such as $LaNi_5$, a part of the initial storage capacity has been sacrificed for this purpose. A further disadvantage of these known materials is that the reactivity is smaller than that of $LaNi_5$, as a result of which the loadability of the cell is smaller too, in particular at low temperatures.

SUMMARY OF THE INVENTION

An object of the invention is to provide, inter alia, an electrochemical cell and an electrochemically active material having a high activity, the capacity of which at a load of 350 mA/g being at most 15 mAh/g, and preferably not more than 10 mAh/g, smaller than at a load of 35 mA/g.

A further object is to simultaneously attain a great stability, the capacity of the electrochemical cell after 400 charging and discharging cycles being at least 50%, and preferably at least 75%, of the initial storage capacity.

A still further object of the invention is to provide materials having at the same time a maximum initial capacity. It is particularly desirable to provide a material whose electrochemical capacity after 400 charging and discharging cycles of the cell is at least 200 mAh/g, related to the weight of the electrochemical material of the negative electrode.

Another object of the invention is to provide a simple and effective method of manufacturing the above-described electrochemically active material.

According to the invention, the object of providing a cell having a high loadability and a material having a great activity is achieved by an electrochemical cell and an electrochemically active material which comprises an intermetallic compound having the $Ca Cu_5$ structure which forms a hydride with hydrogen, the intermetallic compound comprising a metastable phase. The composition of the metastable phase is situated outside the existence range of the intermetallic compound AB at the operating temperature of the electrochemical cell, for example in the temperature range from $-20°$ to $+60°$ C. At such low temperatures the width of the existence range of the intermetallic compound is not highly dependent on the temperature. The term "existence range" means a range of concentrations in a continuous series of intermetallic compounds with which an identical structure can be realized with or without a thermal treatment. See said U.S. Pat. No. 4,487,817.

Particularly suitable is the $CaCu_5$-structure intermetallic compound of the type having the formula $AB_m$. The measures in accordance with the invention are effective when m is larger than approximately 5.1, but clearly improved results are obtained when m is larger than 5.4. The upper limit of m can be determined via the phase diagram, because at too high a value of m no compound of the $CaCu_5$-structure can be formed.

The use of the inventive concept is very advantageous with hydride-forming materials whose composition does not differ very much from that of known materials such as those described in, for example, the aforementioned U.S. Pat. No. 4,487,817. In said patent, the intermetallic compound $AB_m$ consists of component A of Mischmetall or one or more of the elements selected from the group consisting of Y, Ti, Hf, Zr, Ca, Th, La and the other rare earth metals, the overall atomic quantity of the elements Y, Ti, Hf and Zr being less than 40% of the component A. The component B consists of one or more elements selected from the group consisting of Ni, Co, Cu, Fe and Mn. As disclosed in said patent, Mischmetall is a mixture consisting of more than 50% by weight of Ce, about 25% by weight of La, about 25% by weight of a mixture of other rare-earth metals. The exact composition varies according to the place of origin of the material. In accordance with the present invention, the best results as regards the stability of the electrochemically active material and the life cycle of the electrochemical cell are obtained when B consists of Ni and/or Co, to which one or more of the elements selected from the group formed by Cu, Pd and Si may be added.

To obtain a material having a very high electrochemical storage capacity, the atomic quantity of Ni in $AB_m$ is at least 4.0 per gram atom of A.

To obtain a very stable and active electrochemical material, the atomic quantity of Cu is at least 0.5 per gram atom of A.

In addition to the hydride-forming compound with the $CaCu_5$-structure, the electrochemically active material may also comprise a second phase, for example having a catalytic or stabilizing effect.

In accordance with the invention, the object of providing a method of manufacturing an electrochemically active material comprising an intermetallic compound having the $CaCu_5$-structure which forms a hydride with hydrogen and which has the composition $AB_m$ is achieved by a method in which the required quantities of the various components A and B are mixed and melted together and subsequently cooled, during cooling a homogeneity range being traversed in which the composition $AB_m$ is situated, after which the material is cooled at such a rate that a non-stoichiometric phase having the composition $AB_m$ is formed, which phase is metastable at room temperature. By virtue of a rapid cooling operation, for example by quenching in water, the separation of a thermodynamically stable material having a composition in the existence range around the compound $AB_5$, in which range there can be generally only small deviations from the atomic ratio 1:5, is prevented.

As a part of the temperature treatment during the preparation, the material is preferably reannealed at a temperature at which the composition $AB_m$ is situated in a homogeneity range. To obtain compositions having a markedly non-stoichiometric character, it is efficacious to have an excess of the components B in the melt, during cooling precipitates of these components being formed on the grain boundaries of the $AB_m$ material.

The use of Cu in the $AB_m$ material leads to a reduction of the most suitable reannealing temperature and to a widening of the homogeneity range.

BRIEF DESCRIPTION OF THE DRAWINGS

The invention will be explained by means of exemplary embodiments, comparative examples and a drawing, in which.

DETAILED DESCRIPTION OF THE PREFERRED EMBODIMENTS

Example of a rechargeable cell construction.

Figure 1:
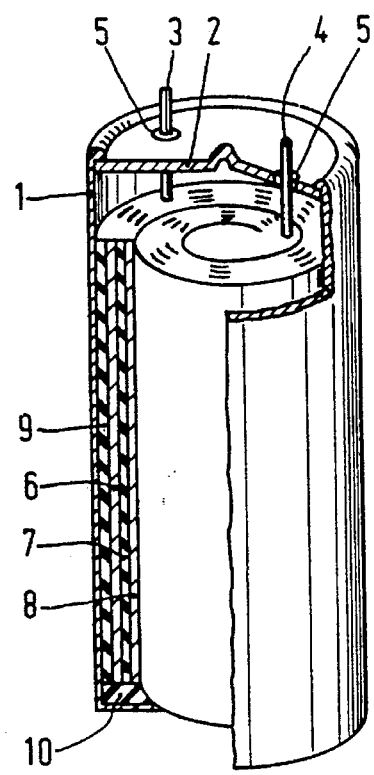
FIG. 1 is a partly sectional and partly elevational view of a sealed rechargeable electrochemical cell in accordance with the invention.

FIG. 1 shows a cell which is sealed from the air and which is manufactured by using a suitable housing 1 of metal such as stainless steel, having a cover 2 in which apertures are formed for conductors 3 and 4. Said conductors are insulated from the metal housing 1, 2 by means of synthetic resin rings 5. The outside diameter of the house may be, for example, 22 mm and the height may be 41 mm. A roll of a negative electrode 6, a separator 7 and a positive electrode 8 are accommodated in the space inside the housing, the assembly being surrounded by an electrically insulating synthetic resin foil 9 of, for example, polyvinyl chloride, and supported by a disc 10 of an electrically insulating material such as polyvinyl chloride.

The negative electrode 6 consists of a hydride-forming intermetallic compound as described hereinbefore and is connected to the conductor 3. The negative electrode 6 is manufactured by melting together suitable quantities of the relevant elements, pulverizing the intermetallic compound thus formed and applying it to a nickel carrier, for example, by means of a polymer binder material such as polyvinyl alcohol. The intermetallic compound can be pulverized, for example by grinding, to a grain size of approximately 40 μm. When the cell is activated by repeated hydrogen adsorption and desorption, the grain size is further reduced to the order of magnitude of 1 μm.

The positive electrode 8 is a nickel hydroxide electrode of the conventional sintered type which is connected to the conductor 4. A 6N potassium hydroxide solution in water is used as the electrolyte. The electrolyte is absorbed in the separator 7 and is in wetting contact with the electrochemically active material of the two electrodes. The separator 7 is in the form of a non-woven membrane of polyamide fibers.

The free gas space in the cell is approximately 5 cm$^3$. A sealed cell of this type has an EMF of between 1.2 and 1.4 V. The cells according to the invention can be assembled in a conventional manner to form batteries comprising, for example, several series-arranged cells.

Example 1

An electrochemically active material for the negative electrode was prepared from an overall composition $LaNi_5Cu$ by mixing the required quantities of the various components, after which they were melted together in an argon atmosphere, cooled and reannealed at 1050° C. for 6 hours, and then rapidly cooled. The electrochemical material thus obtained contains a hydride-forming active phase having the $CaCu_5$-structure and the composition $LaNi_{4.54}Cu_{0.89}$. The remaining quantities of Ni and Cu are present on the grain boundaries of the hydride-forming material in the form of precipitates.

The hydride-forming active material has a composition which is situated outside the existence range of the intermetallic compound at room temperature. In the formula $AB_m$, m has a value of 5.43.

The electrochemically active material manufactured was ground and pulverizing by repeated hydrogen adsorption and desorption. The powder formed has a surface area of approximately 0.25 m$^2$/g. Subsequently, an electrode was made and incorporated in a cell, for example, as described hereinabove.

The properties of the negative electrode were measured at 25° C. by completely charging and discharging the cell at a rate of 350 mA/g. The storage capacity of the negative electrode was determined by carrying out an additional discharging operation at a rate of 35 mA/g. The weight is related to the electrochemical material of the negative electrode. The capacity of the cell increases in the first cycles as a result of an increasing activation of the electrochemically active material. The initial capacity was determined by extrapolating the capacity after at least 10 or 20 cycles to 0 cycles. After a great number of cycles the capacity of the cell decreases, presumably as a result of ageing processes such as corrosion and an increasing electric resistance. The stability was measured by measuring the storage capacity after 400 charging and discharging cycles and was expressed as a percentage of the initial storage capacity. The activity factor was determined by measuring the difference in storage capacity at discharging rates of 35 mA/g and 350 mA/g. The capacity is lower at the higher discharge rate. The electrochemically active material is more active accordingly as the difference is smaller. A great activity provides the electrochemical cell with a high loadability, in particular, also at relatively low temperatures.

In accordance with the present example, the initial capacity was 268 mAh/g. The stability was 81%, so that the capacity after 400 cycles was still 211 mAh/g. The activity factor, which varied little and was measured in accordance with the examples after 180 charging and discharging cycles, was 5 mAh/g. Consequently, the electrochemically active material in accordance with this example, and the electrochemical cell manufactured with said material, amply meet the objects of the invention.

Figure 2:
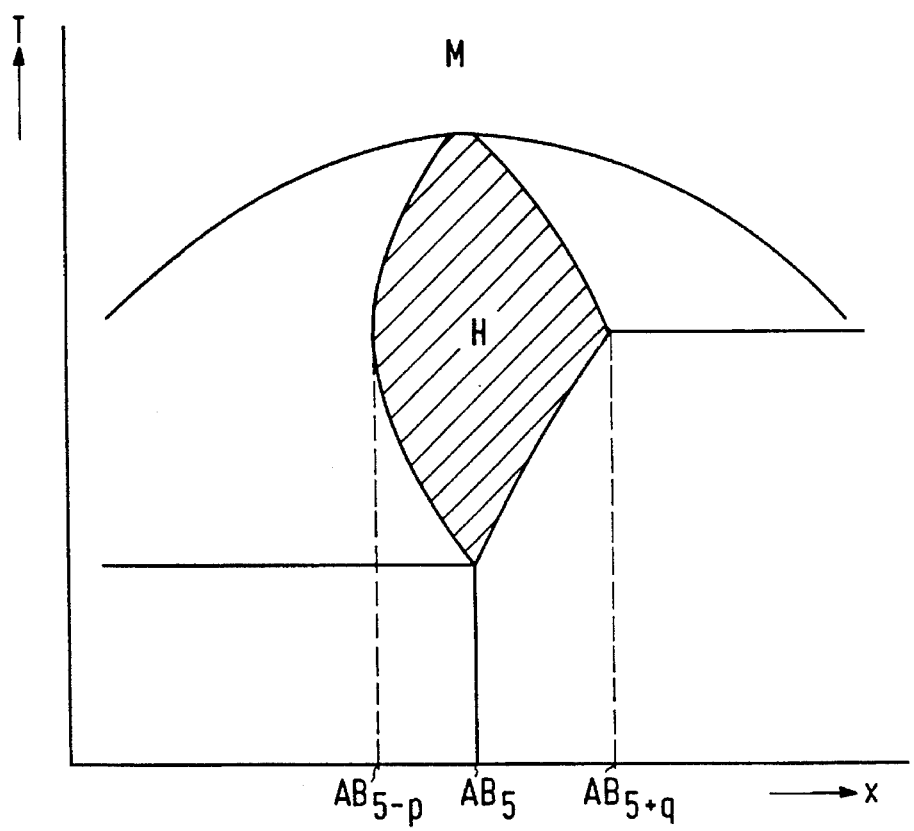
FIG. 2 is a schematic phase diagram of an electrochemically active material in accordance with the invention.

FIG. 2 diagrammatically shows a part of the phase diagram of compounds of the type $AB_m$. During the cooling from the melt M, having an overall composition $AB_x$, where in accordance with the invention x is greater than 5, a homogeneity range H can be traversed. When the temperature T is suitably selected, a phase having the composition $AB_m$ can be formed, where m ranges between 5-p and 5+q. At values of x exceeding for example 5+q, segregations of the B components can be formed in addition to a phase having a composition such as $AB_m$.

By slowly further cooling to a temperature below the homogeneity range, a stoichiometric compound $AB_5$ is formed which is thermodynamically stable at room temperature. The ratio between the A and B components may deviate slightly from 1:5, however, in general it is close to said value, i.e. the existence range at room temperature is narrow.

A phase with a composition $AB_m$ but with a composition outside the existence range of AB at room temperature i.e. with a non-stoichiometric composition can be formed, in accordance with the invention, by cooling at a sufficiently high rate from the homogeneity range. Such a phase is thermodynamically unstable but kinetically stable (metastability). The metastable phase has the $CaCu_5$-structure and can bind large quantities of hydrogen in the form of a hydride.

The exact form of the homogeneity range and the corresponding temperature intervals depend on the choice of the components A and B. When B consists completely or substantially of Ni, the homogeneity range is situated at a higher temperature than when a considerable part of B consists of Cu.

Examples 2 to 6

Electrochemically active materials were manufactured as indicated in the above example, after which electrodes were manufactured which were incorporated into electrochemical cells. In Table I below, the overall compositions of the melts, the initial capacity C(O), the activity factor A(180) after 180 charging and discharging cycles and the stability S(400) after 400 charging and discharging cycles are shown, all parameters being measured in accordance with the previous exemplary embodiment.

TABLE 1

| no. | A | | B | | | C(O) | A(180) | S(400) |
|---|---|---|---|---|---|---|---|---|
| | La | Nd | Ni | Co | Cu | mAh/g | mAh/g | % |
| 2 | 1.0 | — | 5.0 | — | 0.5 | 340 | 13 | 22 |
| 3 | 1.0 | — | 5.0 | — | 1.5 | 182 | 5 | 97 |
| 4 | 1.0 | — | 5.0 | — | 2.0 | 162 | 4 | 94 |
| 5 | 0.8 | 0.2 | 5.0 | — | 1.0 | 215 | 6 | 95 |
| 6 | 0.8 | 0.2 | 4.0 | 1.0 | 1.0 | 280 | 3 | 61 |

During rapidly cooling the above compositions from the melt, non-stoichiometric phases having the $CaCu_5$-structure were formed, with precipitates of the residual material on the grain boundaries. In the examples 2, 3 and 4, the composition of the hydride-forming phase was $LaNi_{4.70}Cu_{0.46}$ ($AB_{5.16}$), $LaNi_{4.49}Cu_{1.25}$ ($AB_{5.74}$) and $LaNi_{4.34}Cu_{1.63}$ ($AB_{5.97}$), respectively.

By comparing examples 2 to 4 with exemplary embodiment 1 and comparative example V1, it appears that a small quantity of Cu (example 2) leads to an improved activity and stability, and that the effect becomes stronger as the quantities increase. The initial capacity decreases at larger quantities of Cu, so that the optimum lies at a composition close to that of example 1. Besides, it has been found that the properties in accordance with example 2 can be further improved by adapting the reannealing treatment (temperature, time, cooling rate).

From examples 5 and 6 it appears that also with substituted $AB_m$ compounds (for example Nd for La and Co for Ni) the measures in accordance with the invention are effective.

The compositions 2 to 6 all exhibit a great activity and, hence, satisfy the most important object of the invention. The stability is great, in particular, in the case of compositions 3 to 5, while composition 6 combines a great activity with a high initial capacity.

Example 7

An electrochemically active material was manufactured from a melt having an overall composition $LaNi_{5.5}Si_{0.5}$, after which an electrode was manufactured in accordance with example 1, which electrode was incorporated in an electrochemical cell. The initial capacity of the cell was 240 mAh/g, the activity factor after 180 cycles was 11 mAh/g and the storage capacity after 400 cycles was 191 mAh/g, i.e. 80% of the initial capacity. Consequently, this material and the cell manufactured therefrom meet the objects of the invention. Moreover, this material exhibits a high rate of activation, i.e. the storage capacity of the electrochemical cell reaches the maximum value after a small number of cycles.

Example 8

An electrochemically active material was manufactured from a melt having an overall composition $LaNi_{5.0}Pd$, after which an electrode was manufactured in accordance with exemplary embodiment 1, which electrode was incorporated in an electrochemical cell. The initial capacity of the cell was 190 mAh/g, the activity factor after 180 cycles was 8 mAh/g and the storage capacity after 400 cycles was 186 mAh/g, i.e. 98% of the initial capacity. This material is very active and exhibits an extremely high stability, and the storage capacity after 2000 cycles was still 165 mAh/g.

Examples 9 to 13

Electrochemically active materials were manufactured as described in example 1, after which electrodes were manufactured which were incorporated in electrochemical cells. In Table II below, the overall compositions of the melts, the initial capacity C(O), the activity factor A(180) and the stability S(400) are listed; they were all measured as indicated in example 1.

TABLE II

| no. | composition | C(O) mAh/g | A(180) mAh/g | S(400) % |
|---|---|---|---|---|
| 9 | LaNi$_6$ | 340 | 14 | 16 |
| 9* | LaNi$_6$ | 296 | 12 | 31 |
| 10 | LaNi$_5$Ag | 334 | 15 | 16 |
| 11 | LaNi$_{5.5}$Al$_{0.5}$ | 345 | 8 | 19 |
| 12 | LaNi$_5$Cr | 333 | 14 | 24 |
| 13 | LaNi$_5$Co | 332 | 13 | 27 |

When the above compositions were rapidly cooled from the melt, non-stoichiometric phases having the CaCu$_5$-structure were obtained, with precipitates of the residual material being formed on the grain boundaries. These materials, which have a great initial capacity exhibit a great activity and, consequently, satisfy the first object of the invention. It was found, that the stability could be further improved by adapting the reannealing treatment of the electrochemically active material, with each composition seemingly having a different optimum temperature.

The material in accordance with example 9° has the same overall composition as in example 9, but the reannealing treatment was carried out at 1200° C. for 96 hours, followed by quenching in water. The composition of the hydride-forming phase in example 9 was LaNi$_{5.1}$, the composition in example 9° was LaNi$_{5.5}$. As a result of the different reannealing treatment, the composition of the material of example 9° deviates more from the stoichiometric composition LaNi$_5$. As a result thereof, the initial capacity decreases slightly, but the activity and the stability of the hydride-forming phase are strongly improved.

Comparative Examples V1 to V3

Electrochemically active materials were manufactured in accordance with the state of the art, after which electrodes were manufactured which were incorporated in electrochemical cells. In Table III below, the compositions of the materials, the initial capacity C(O), the activity factor A(180) and the stability S(400) are listed; they were all measured as indicated in exemplary embodiment 1.

TABLE III

| no. | composition | C(O) mAh/g | A(180) mAh/g | S(400) % |
|---|---|---|---|---|
| V1 | LaNi$_5$ | 296 | 18 | 15 |
| V2 | La$_{0.8}$Nd$_{0.2}$Ni$_{2.5}$Co$_{2.4}$Si$_{0.1}$ | 293 | 34 | 86 |
| V3 | La$_{0.8}$Nd$_{0.2}$Ni$_{2.9}$Co$_{2.1}$Si$_{0.1}$ + 0.1 MoCo$_3$ | 285 | 10 | 73 |

The compositions of V1 to V3 are situated in the existence range of the relevant intermetallic compounds and are in thermodynamic equilibrium at room temperature. Composition V1 is an unsubstituted LaNi$_5$ compound having a large initial capacity and a sufficiently great activity, but a small stability.

Composition V2 is manufactured in accordance with U.S. Pat. No. 4,487,817 and has a strongly improved stability, but the activity is comparatively small.

Composition V3 is manufactured in accordance with the non-prepublished Netherlands Patent Application NL 8901776 which corresponds substantially to U.S. Pat. No. 5,071,720 from a melt having the composition La$_{0.8}$Nd$_{0.2}$Ni$_{2.9}$Co$_{2.4}$Si$_{00.1}$Mo$_{0.1}$. This material is two-phase and consists of a thermodynamically stable phase having the CaCu$_5$-structure which can store hydrogen in the form of a hydride, and of a catalytic phase with the composition MoCo$_3$, in which some Ni may be present. By virtue of the presence of the catalytic phase, this material exhibits a great activity but the stability is somewhat reduced relative to composition V2.

Relative to the known materials V1 and V2, the hydride-forming materials according to the invention exhibit a great activity which can be combined with a high stability. The new materials form a suitable alternative to the non-prepublished material V3. By means of further investigation of the phase diagrams and the resulting adaptation of the temperature treatments, and by the choice of the components of the AB$_m$ compound, the invention permits the optimization of the electrochemical properties of the hydride-forming material and electrochemical cells manufactured therewith.

We claim:

1. A method of manufacturing an electrochemically active material comprising an intermetallic compound having the CaCu$_5$-structure which compound forms a hydride with hydrogen and which compound comprises a metastable phase having a composition of the formula AB$_m$, wherein m exceeds 5.1, A is Mischmetall or at least one element selected from the group consisting of Y, Ti, Hf, Zr, Ca, Th, La and the other rare earth metals, the overall atomic quantity of the elements Y, Ti, Mb and Zr being less than 40% of A and B is at least one element selected from the group consisting of Ni, Co, Cu, Pd, Fe, Mn and Si, said method comprising mixing and melting the quantities of the components A and B required for a melt of said compound, cooling the resultant melt first to a homogeneity region in which the composition of the formula AB$_m$ is located and then cooling said melt rapidly at a rate such that a phase of the composition of the formula AB$_m$ that is metastable at room temperature is formed.

2. A method of manufacturing an electrochemically active material comprising an intermetallic compound having the CaCu$_5$-structure which compound forms a hydride with hydrogen and which compound comprises a metastable phase having a composition of the formula AB$_m$, wherein m exceeds 5.4, A is Mischmetall or at least one element selected from the group consisting of Y, Ti, Hf, Zr, Ca, Th, La and the other rare earth metals, the overall atomic quantity of the elements T, Ti, Mb and Zr being less than 40% of A and B is at least one element selected from the group consisting of Ni, Co, Cu, Pd and Si, said method comprising mixing and melting the quantities of the components A and B required for a melt of said compound, cooking the resultant melt first to a homogeneity region in which the composition of the formula AB$_m$ is located and then cooling said melt rapidly at a rate such that a phase of the composition of the formula AB$_m$ that is metastable at room temperature is formed.

3. A method as claimed in claim 2 wherein the material is reannealed after cooling at a temperature at which the composition AB$_m$ is situated in a homogeneity range but before further cooling.

4. A method as claimed in claim 2 wherein an excess of the components B is present in the melt, and wherein during cooling precipitates of these components are formed on grain boundaries of the AB$_m$ material.

5. A method as claimed in claim 3 wherein an excess of the components B is present in the melt, and wherein during cooling precipitates of these components are formed on grain boundaries of the $AB_m$ material.

6. A method as claimed in claim 2, characterized in that the material is reannealed at a temperature at which the composition $AB_m$ is situated in a homogeneity range.

7. A method as claimed in claim 2, characterised in that an excess of the components B is present in the melt, and in that during cooling precipitates of these components are formed on grain boundaries of the $AB_m$ material.

8. A method as claimed in claim 6 wherein the excess of the components B is present in the melt, and during cooling precipitates of these components are formed on grain boundaries of the $AB_m$ material.

* * * * *